US012421781B2

(12) United States Patent
Todorov et al.

(10) Patent No.: US 12,421,781 B2
(45) Date of Patent: Sep. 23, 2025

(54) DEVICE FOR OPENING OR CLOSING OF A WINDOW OR DOOR AND A SYSTEM AND METHOD FOR CONTROLLING AND MANAGEMENT OF THE AIR QUALITY OF INDOOR PREMISES

(71) Applicant: BULINFO EOOD, Sofia (BG)

(72) Inventors: Gabriel Todorov Todorov, Sofia (BG); Krasimir Georgiev Slavchev, Sofia (BG)

(73) Assignee: Bulinfo Eood, Sofia (BG)

(*) Notice: Subject to any disclaimer, the term of this patent is extended or adjusted under 35 U.S.C. 154(b) by 386 days.

(21) Appl. No.: 17/800,638

(22) PCT Filed: Feb. 23, 2021

(86) PCT No.: PCT/EP2021/054409
§ 371 (c)(1),
(2) Date: Aug. 18, 2022

(87) PCT Pub. No.: WO2021/170563
PCT Pub. Date: Sep. 2, 2021

(65) Prior Publication Data
US 2023/0073483 A1 Mar. 9, 2023

(30) Foreign Application Priority Data
Feb. 26, 2020 (EP) .................................... 20472001

(51) Int. Cl.
*E05F 15/619* (2015.01)
*G05B 15/02* (2006.01)

(52) U.S. Cl.
CPC ............ *E05F 15/619* (2015.01); *G05B 15/02* (2013.01); *E05Y 2201/434* (2013.01);
(Continued)

(58) Field of Classification Search
USPC ........................................................ 700/275
See application file for complete search history.

(56) References Cited

U.S. PATENT DOCUMENTS

| 4,511,832 A * | 4/1985 | Schmitz ................ E05F 15/603 83/369 |
| 9,672,717 B1 * | 6/2017 | Slavin .................... G08B 21/18 |

(Continued)

FOREIGN PATENT DOCUMENTS

| CN | 107678381 B | 12/2019 |
| EP | 0534413 A1 | 3/1993 |

(Continued)

*Primary Examiner* — Emilio J Saavedra
(74) *Attorney, Agent, or Firm* — Elmore Patent Law Group, P.C.; Joseph C. Zucchero; Carolyn S. Elmore

(57) ABSTRACT

The invention relates to a device for automatically opening or closing a window or a door and system and method for controlling and managing indoor air quality via the Internet. The system monitors indoor air parameters through sensors, and when these parameters reach predefined user thresholds, provides room ventilation through natural air convection by automated opening/closing of doors and/or windows. The automatic opening/closing device (26) consists of a housing with means for fixed attachment to a window or a door. The housing hosts: a stepper motor (16) and a means for transforming the rotary motion into a linear motion (9, 13) which drives an extended flexible connection (10, 11). The flexible connection (10, 11) pushes or pulls a support element (1) which is mounted on a window/door, thereby opening the window or door.

14 Claims, 8 Drawing Sheets

(52) U.S. Cl.
CPC ... *E05Y 2201/656* (2013.01); *E05Y 2201/724* (2013.01); *E05Y 2900/132* (2013.01); *E05Y 2900/148* (2013.01)

(56) References Cited

U.S. PATENT DOCUMENTS

| | | |
|---|---|---|
| 2004/0182528 A1 | 9/2004 | Rieder et al. |
| 2005/0284030 A1* | 12/2005 | Autovino ............. E05B 65/104 52/1 |
| 2007/0012100 A1* | 1/2007 | Mouridsen ............. E05F 15/71 73/170.17 |
| 2015/0194039 A1 | 7/2015 | Martin |
| 2018/0023834 A1* | 1/2018 | Hatch ................. H04L 12/4625 700/278 |
| 2018/0148970 A1 | 5/2018 | Houser et al. |

FOREIGN PATENT DOCUMENTS

| | | | | |
|---|---|---|---|---|
| EP | 2607595 A1 | 6/2013 | | |
| EP | 3369882 A1 | 9/2018 | | |
| EP | 3505712 A1 | 7/2019 | | |
| WO | WO-0037760 A1 * | 6/2000 | .............. | E05F 11/06 |
| WO | WO-2019084601 A1 * | 5/2019 | ............... | E04B 1/00 |

* cited by examiner

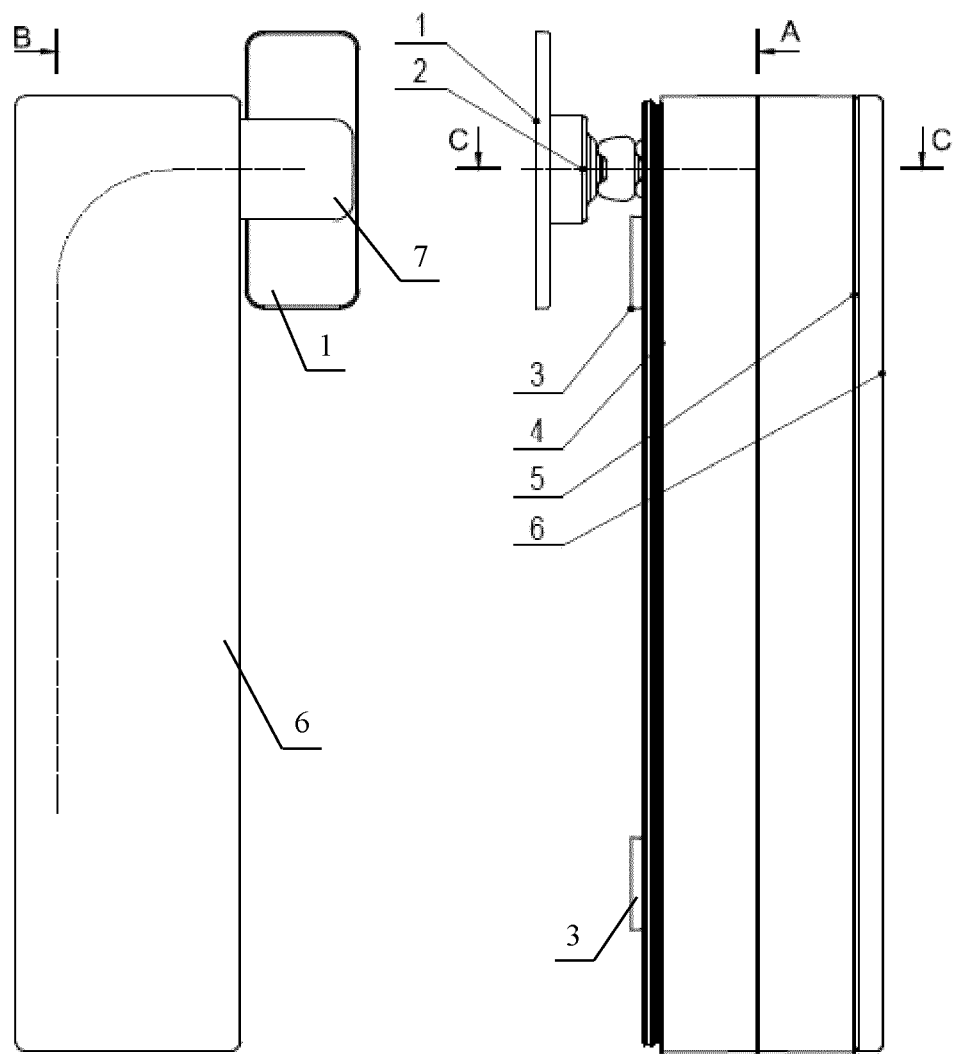
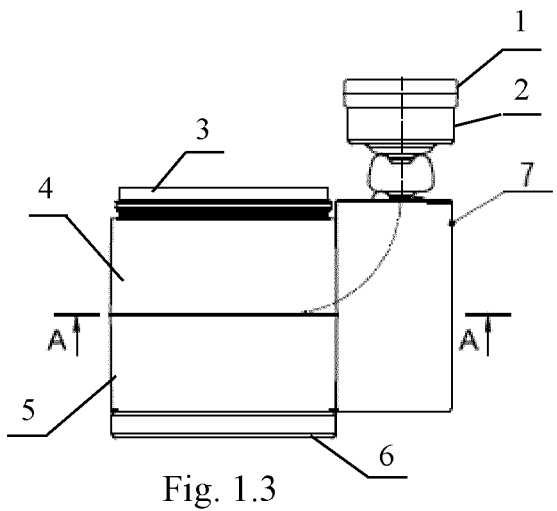
Fig. 1.1  Fig. 1.2
Fig. 1.3

C - C
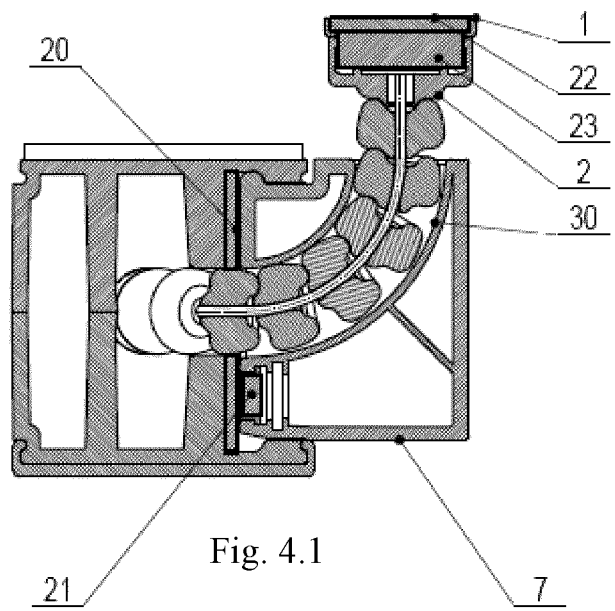
Fig. 4.1
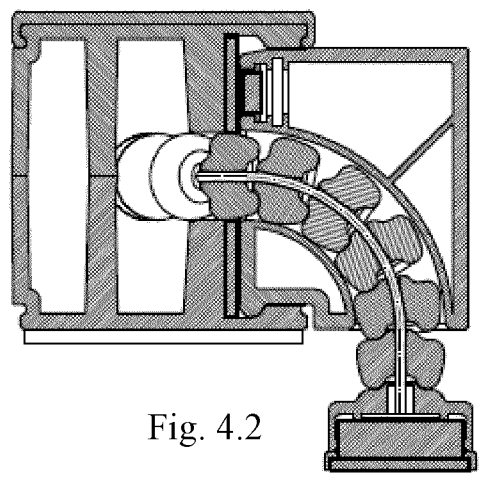
Fig. 4.2

DEVICE FOR OPENING OR CLOSING OF A WINDOW OR DOOR AND A SYSTEM AND METHOD FOR CONTROLLING AND MANAGEMENT OF THE AIR QUALITY OF INDOOR PREMISES

TECHNICAL FIELD OF THE INVENTION

The present invention relates to a device for automatically opening or closing a window or door, a system and method for controlling and managing the indoor air quality via the Internet. The system measures indoor air quality parameters and provides ventilation with the use of natural air convection by automated opening/closing of doors and/or windows.

BACKGROUND OF THE INVENTION

Known indoor air quality monitoring systems include sensors for monitoring various air parameters such as carbon dioxide, carbon monoxide, fine dust particles, humidity and temperature, which send a signal to a remote terminal when any parameter exceeds its threshold values (CN108153186). Such systems are for notification purposes only and require additional intervention to change the monitored indicators.

CN109197271 discloses an intelligent ventilation system for blinds or shutters, including an environmental monitoring module, a microprocessor module, a shutter opening/closing actuator, and a LoRa wireless module. The environmental monitoring module includes a carbon dioxide, temperature, humidity, wind, rain, snow and angle sensors. The microprocessor module commands the actuator to open the louvre when the concentration of carbon dioxide, the temperature and humidity in the greenhouse are higher than their preset concentrations and values; and commands the actuator to close the louvre, when the concentration of carbon dioxide and the temperature and humidity are lower in the greenhouse than the preset values. Additionally, the system monitors wind speed, rain and snow outside the greenhouse according to which the microprocessor module decides whether to open or close the louvre. The system is complex and expensive and is not applicable to habitable premises.

Existing indoor air quality monitoring and control systems are known to include sensors for various air parameters, air-conditioning or ventilation devices, and a control unit that activates the air-conditioning or ventilation devices to reach a preset threshold values (CN107062565, CN205245461, CN109140702). Such systems require the installation of expensive air-conditioning or ventilation systems, which include wall punching, high power consumption, and costly maintenance.

The KR20170022019 (A) is a ventilation system known for its smart window with intelligent sliding properties. The ventilation system includes a sliding sash automatic opening/closing device, a carbon dioxide sensor installed in the room, a control unit which automatically activates the opening device when the concentration of carbon dioxide is higher than the preset limit value. The control unit has a wireless communication terminal and connects to a remote client device, such as a mobile phone, which can remotely monitor carbon dioxide concentration in real time, set carbon dioxide limit values, and directly control the opening/closing of the window. This system is limited to sliding sash windows only and requires the installation of the device for opening/closing of windows into the window frame, which makes the windows more expensive and the maintenance of the system difficult.

Also known is a natural ventilation system (RU41783U1), which includes a mechanical device for opening and closing the movable sash of a window, which is controlled remotely by a microprocessor, connected to a system of sensors for monitoring various parameters of the internal (temperature, humidity) and the external environment (noise, temperature, man-made pollution such as carbon dioxide, etc.). The microprocessor opens or closes a movable built-in portion of the window when the values of the monitored parameters exceed the preset limits. The system has limited capabilities for remote control and real-time monitoring of air parameters by a remote user.

Another device for automatic opening/closing of a window (CN109197271 A) comprises of a housing unit that can be mounted to the frame of a sliding sash window, controlling unit and geared electric motor that drives a chain which is located in a guide groove in the housing. The front end of the chain extends outside of the housing unit and is connected to a slot in the window frame. The device is noisy and does not allow the chain to bend in more than one plane, which limits its mounting and application.

SUMMARY OF THE INVENTION

The aim of the invention is to provide a compact device for the automatic opening and closing of a window or door, allowing easy and convenient mounting to windows and doors of any kind, with any type of frames and way of opening. The invention also aims for the automatic opening/closing device to operate at low noise levels so that it would not disturb those present in the room. An additional task is that the automatic opening/closing device can be controlled remotely, including via the Internet.

An objective of the invention is to provide an indoor air quality control and management system providing room ventilation using natural air convection by automatic opening/closing of doors and/or windows. Furthermore, the invention aims to provide a system with a wireless connection between its separate devices that can be controlled and monitored over the Internet. Another aim of the invention is to provide a method for operating an indoor air quality control and management system.

These and other aims are achieved by creating an external device for automatically opening/closing of a window or door, which consists of a housing unit that has means for fixed attachment to an opening sash or to a frame of a window/door.

In said housing are arranged:
a stepper motor with an electronic control unit comprising a driver and controller with a microprocessor adapted to supply control pulses for the direction, speed and rate of rotation of the motor, and with a means for connecting to a power source;
means for transforming the motor's rotational motion into linear motion;
an extended flexible connection that is rigid in its extension direction but is flexible in more than one direction transversely to its extension said directions laying in different planes; the flexible connection is located in a leading groove in the housing with at least one curved section for changing the direction of movement of the flexible connection, wherein one end of the flexible connection is connected to the motion-transforming means, and the other end of the flexible connection passes freely through an opening in the housing and is connected to a support element that have means for attaching to a frame of the window/door.

According to the invention, the motion-transforming means is adapted to move the flexible connection back-and-forth between the front-end and rear-end final positions so that when the axis of the motor is rotated in one direction, the flexible connection is retracted into the housing to the rear-end final position and pulls the support element. When rotating the axis of the motor in the opposite direction, the flexible connection extends beyond the housing to the front-end final position by pushing the support element away from the unit.

It is important that the flexible connection is flexible in several directions transversely to its extension in order to change the direction of movement of the flexible connection. This allows to simplify the construction of the device and also provide for easy change of the operational direction of the device to be used with doors/windows with different design.

In one embodiment, the flexible connection is connected to the support element through a detachable joint, allowing the flexible connection to be separated from the support element. This can happen when applying a predetermined tensile force greater than the force required to pull the support element to the housing.

It is also possible for the flexible connection to be connected to the motion-transforming means through a detachable joint. This allows separation of the flexible connection from the motion-transforming means when a force, greater than the force for pushing the support element from the housing, is applied.

Preferably, the joints mentioned above are magnetic joints.

The flexible connection may consist of a flexible wire, along which many rigid bead-like elements are threaded via a central trough channel. The bead-like elements are arranged next to each other and touch one another. Preferably, the beads have a circular, square or other regular polygonal shape in cross-section perpendicular to the trough channel; and in cross-section parallel to the trough channel the beads have rounded protrusions or indentations so that the rounded protrusions of one bead with the rounded indentations of an adjacent bead can form a common hinge surface defining the bending of the flexible connection in more than one direction.

In a preferred embodiment of the device, the motion-transforming means is designed as a screw gear and includes a leading screw mounted in the housing with ability for free rotation in two directions. The leading screw is connected to the axis of rotation of the stepper motor and on the screw a coupling element is mounted by means of a motor nut. The coupling element is positioned in a straight-line guide channel allowing for reciprocating motion, with one end of the flexible connection fixed to the coupling element.

Preferably, the device also has a wireless communication module, which allows it to connect with a remote device. The wireless communication module is connected to an electronic motor control unit adapted to send data and to receive data and control signals from the remote device. This allows the remote device to control the motor.

The device, according to the invention, is compact, reliable, easy to install and is suitable for doors and windows of different frame designs and configurations. Owing to the screw mechanism and the design of the flexible connection, the device works very quietly and does not disturb the occupants indoors.

An indoor air quality control and management system with at least one opening is also provided by the invention. The system includes:

an indoor air parameters sensor unit comprising a wireless module for transmitting and receiving information and at least one sensor of the following: carbon dioxide and/or other gas sensor, humidity sensor and temperature sensor;

a noise sensor with a wireless module for transmitting information located close to said at least one opening of the room (door or window);

at least one device for automatically opening/closing in accordance with the invention attached to said at least one opening of the room (door or window) with a wireless module for transmitting and receiving information;

a management server comprising of at least a memory, a processor, a data input module, a timing control module, and an Internet module; the management server is connected to the sensor unit for air parameters, to the noise sensor for receiving data, and to the automatic opening/closing device and sends control signals.

According to the invention, the management server is adapted to compare the data obtained from the sensors with predetermined threshold values and/or threshold ranges. When the values of the monitored parameters are below or above the respective threshold values and/or threshold ranges, and/or at a certain time, recorded by the timing module, the management server is adapted to send a control signal to the automatic opening/closing device, which results in the opening or closing at least one opening (door or window) of the room.

In one embodiment of the system, the management server is connected to the indoor air parameters sensor unit via the Internet. The indoor air sensor unit, in turn, is connected to the automatic opening/closing device via a local wireless connection.

In an alternative embodiment of the system, the management server is connected directly via the Internet to both the automatic opening/closing device and the sensor unit.

In a preferred embodiment of the system, the management server is connected via the Internet to a remote client device for transmitting information and receiving data such as threshold values and/or control signals.

Also, a method for controlling and managing indoor air quality performed by the system, according to the invention is provided, comprising:
setting up the below parameters in the management server:
at least one threshold and/or threshold range for each of the parameters monitored, such as but not limited to: temperature, carbon dioxide concentration, air humidity, noise level, and/or
a certain hour of the day or time interval;
receiving in the management server the current monitored parameters from the sensors and comparing them with the set threshold values;
submission of a control signal to the automatic opening/closing device with instructions for either opening or closing of the at least one opening of the room (window or door) when deviation from the thresholds and/or threshold ranges, and/or upon the occurrence of the specified hour or the expiration of the pre-specified time interval occurs.

In one embodiment of the method, the parameters monitored are ranked by priority for determining the control signal to the automatic opening/closing device.

The system and method, according to the invention, ensure the reduction in external noise levels by automated closing of doors and/or windows, while reducing of the levels of harmful substances in enclosed spaces by ventilation and natural convection.

The system is easily installed in any enclosed and indoor spaces, to doors and windows of different construction, and does not require installation or construction work.

The system has wireless connections and communication among devices and units and can be controlled via the Internet. The system can be completely autonomous.

BRIEF DESCRIPTION OF TECHNICAL DRAWINGS

In further detail, the device, system and method (according to the invention) are explained by preferred embodiments provided as non-limiting examples of the invention, with reference to the accompanying figures, wherein:

FIGS. 1.1, 1.2 and 1.3 are respectively front, side and top views of the automatic opening/closing device in an exemplary embodiment;

Figure 3:
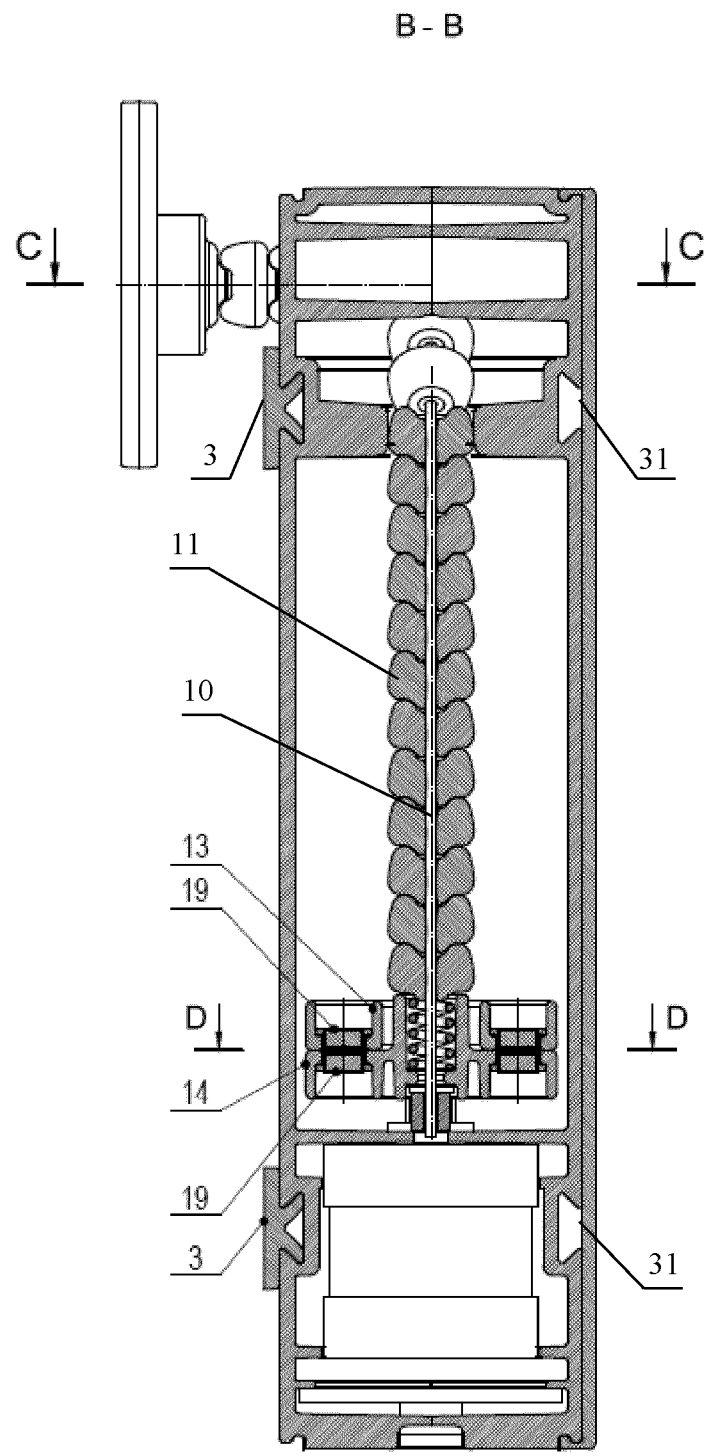
FIG. 3 is a longitudinal cross-section along the B-B line of FIG. 1.1 of the automatic opening/closing device.
Figure 5:
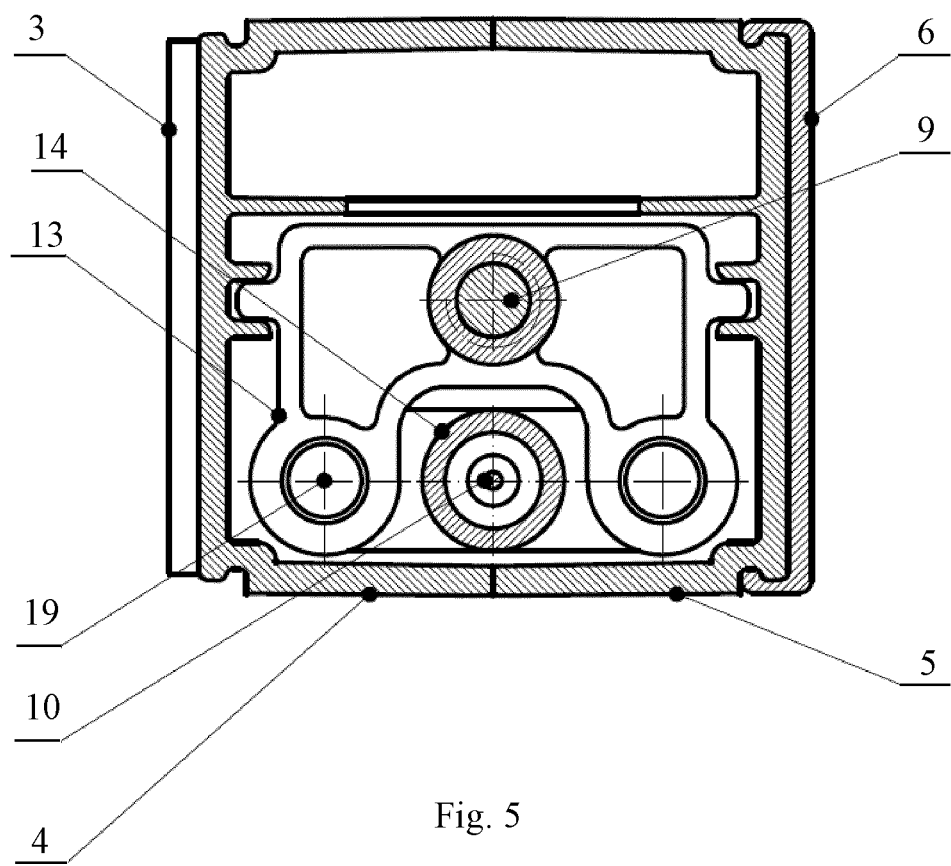
Figure 6:
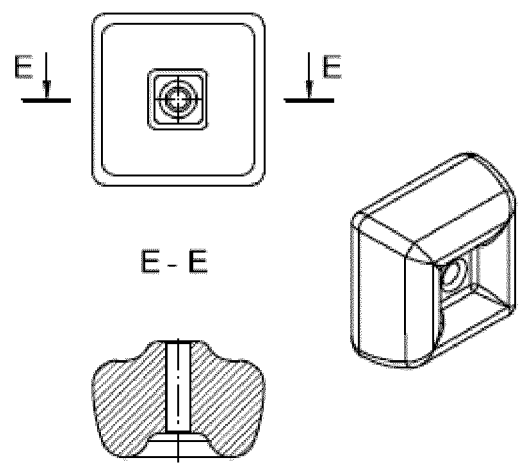
Figure 7:
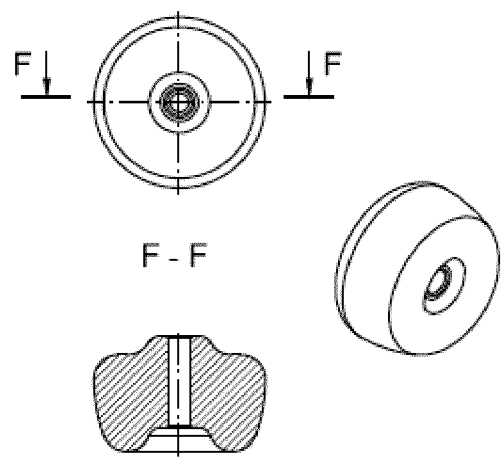
Figure 8:
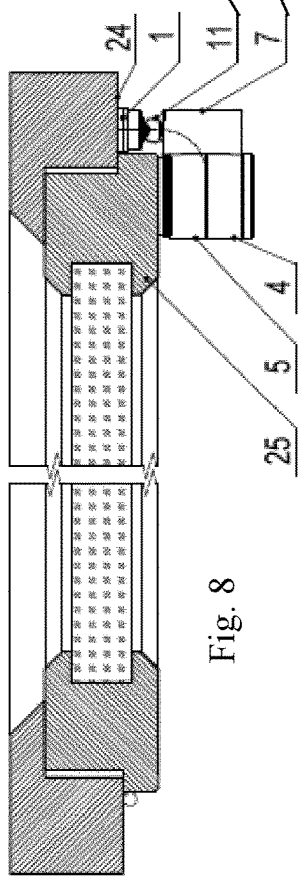
Figure 10:
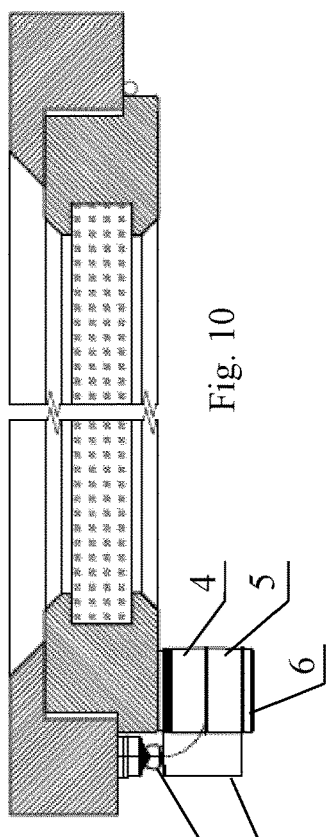
Figure 9:
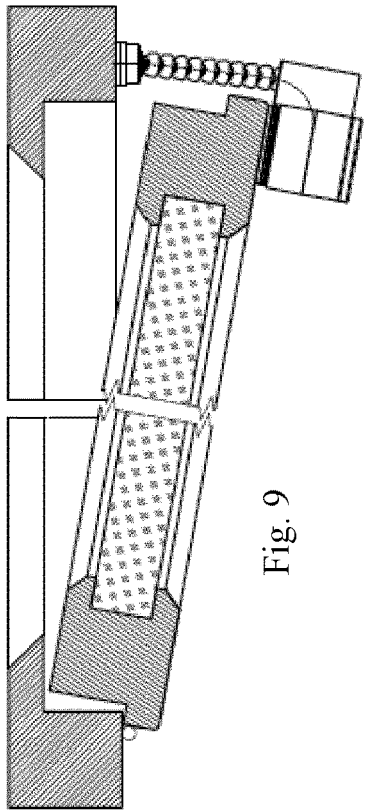
Figure 11:
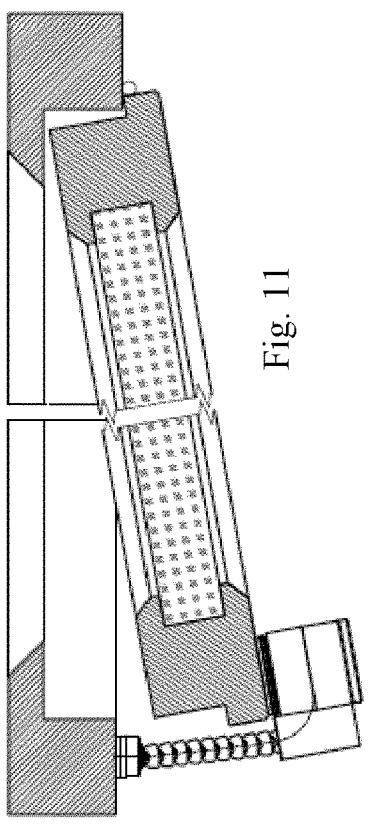
Figure 12:
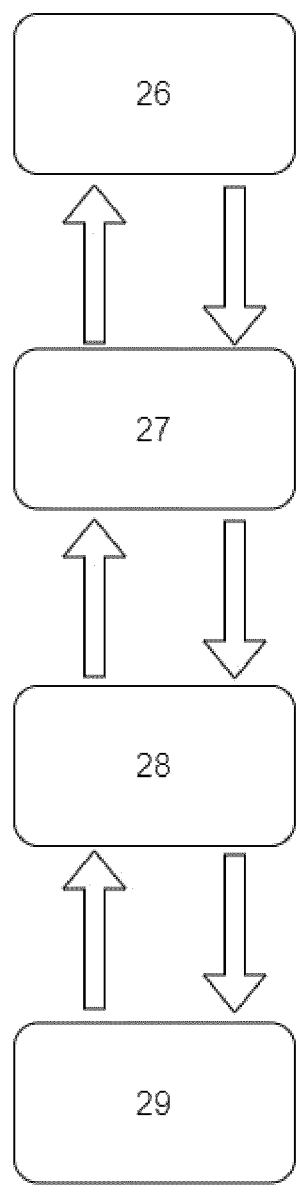

FIGS. 4.1 and 4.2 represent cross-sections along the C-C line of FIG. 1.2 with the left and right positions, respectively, of the direction-shifting device;

FIG. 5 is a cross-sectional view along the D-D line of FIG. 3 of the automatic opening/closing device and shows the magnetic detachable joint between the rear end of the flexible connection and the coupling element of the motion-transforming means;

FIG. 6 shows the views of a square bead-like element from above, panoramic view from the side and a cross-section along the E-E line;

FIG. 7 shows the views of a circular bead-like element from above, panoramic view from the side and a cross-section along the F-F line;

FIGS. 8 and 9 show a window-mounted opening/closing device with a conditional right placement of the flexible connection in the open and closed position of the window, respectively;

FIGS. 10 and 11 show a window-mounted opening/closing device with a conditional left placement of the flexible connection in the open and closed position of the window, respectively;

FIG. 12 is a conditional block diagram of an indoor air quality control and management system, in a preferred embodiment of the interconnections of the individual units.

EXAMPLES OF THE IMPLEMENTATION AND OPERATION OF THE INVENTION

According to the invention, the window or door automatic opening/closing device consists of a housing, a flexible connection and actuators for the flexible connection. On one side of the housing there are means for attaching it to the frame of a window or door. The attachment could be achieved using double-adhesive tape, screw assemblies or similar. The housing could be made of metal, plastic or composite materials.

The device has a stepper motor 16 for moving the flexible connection, with an electronic control unit 12. The control unit comprises a driver and a microprocessor controller, which is adapted to supply control pulses for the direction, speed and rate of rotation of the motor 16. The motor could be 12 V, 2.5-3 A with a power supply input 18 and a corresponding circuit board 17. The motor can be powered by a battery or directly via an adapter through the electric grid. The battery is preferably rechargeable.

The flexible connection 10, 11 is an elongated element that is rigid along the direction of extension and transversely flexible in several directions laying in different planes.

The motor 16 drives in two directions motion-transforming means for transforming rotary motion into linear motion. The motion-transformation means is preferably done with a screw mechanism. In the embodiment shown in FIGS. 2 and 3, the motion-transforming means consists of a lead screw 9 which is mounted to the housing by at least one bearing 8 to ensure free movement in either direction. The lead screw 9 is connected to and driven by stepper motor 16. A coupling element 14 is mounted to the lead screw 9 by means of a motor nut 13 and is also attached to the flexible connection. The connection between the lead screw 9 and the motor nut 13 may be threaded or of ball-screw pair type. The coupling element 14 is situated in a straight guide groove in the housing so that it can move freely in a reciprocating manner between two end positions. The two extreme positions are hereinafter referred as "front" and "rear". At the same time, the coupling element 14 is constrained laterally by the guide groove to prevent rotation relative to the lead screw 9. When operating the motor 16 in one direction, the lead screw 9 rotates in the same direction so that the motor nut 13 and the coupling element 14 move along the lead screw 9. For example, when the motor 16 is rotating the lead screw 9 so that the motor nut 13 is moving forward relative to the motor 16 that also drives the coupling element and the flexible connection 10, 11 forward and when the motor 16 is rotating in opposite direction the motor nut 13 and the coupling element 14 is moving backward and draw back the flexible connection inside the housing. Means may also be provided to determine when the flexible connection has reached one of its end positions to stop the motor 16. In one embodiment, the controller is adapted to monitor the inverse electromagnetic voltage of the motor i.e. the engine load is monitored and the controller stops the motor when the maximum load is reached. The end positions of the flexible connection may be determined by sensors, which send a signal to the control unit, or by switches located at the end positions of the coupling element 14.

One end of the flexible connection, conditionally referred as "rear", is connected to the coupling element 14. The other end of the flexible connection, conditionally referred as "front", passes freely through an opening in the housing and is connected to a support element 1. In the case where the housing is fixed to the sash of the window 25, the support element 1 is fixed to the frame of the window 24 (FIGS. 8, 9, 10, 11). Conversely, when the housing is fixed to the frame of the window 24, the supporting element 1 is attached to the window sash 25. The latter option is suitable for installation of the device to a dormer. As the flexible connection moves back and forth in the housing, it pushes or pulls back the support element 1, thereby increasing or shortening the distance between the support element 1 and the housing. This results in opening or closing the window or door. The support element may be a flat plastic or metal plate.

The housing has at least one curved guide groove 30 which steers the direction of movement of the flexible connection. In the embodiment shown in FIG. 2, the lead screw 9 and the guide groove of the coupling element are arranged along the extension of the housing. This makes it more convenient for the flexible connection to change its direction along the short side of the housing. This is achieved with a curved guide groove 30 in the housing for the flexible connection to change direction at 90 degrees. A direction-changing attachment 7 is also provided which can be mounted at the opening for the flexible connection where it extends beyond the housing. The direction-changing attachment's housing provides another curved channel that allows changing the direction of the flexible connection again at 90 degrees (FIG. 4.1). The second change of the direction of the flexible connection is possible due to the properties of the flexible connection that is flexible and can be bent in several directions transversely to its extension. In order for the direction-changing attachment 7 to be easily dismantled and turned, a detachable connection to the housing is provided. For example, this may be achieved by means of a magnet 21 and a metal plate 20 mounted in the housing (FIG. 4.1), by rails and grooves etc. The direction-changing attachment 7 can be rotated and mounted at 180° so that it can reverse the flexible connection in the opposite direction (FIGS. 4.1 and 4.2). This design allows the device to be mounted on different door and window constructions, as shown in FIGS. 8, 9, 10 and 11.

The flexible connection may be a rod made of metal or polymeric material, which is rigid along its extension and flexible in the direction transversely to its extension and can be bent at different angles without breaking its integrity. It is possible to use a polymeric tube corrugated in part or along its entire length. The corrugated section of the tube can bend in any direction transverse to the extension of the tube. In a preferred embodiment, the flexible connection may consist of a flexible wire, along which many rigid bead-like elements with a central through channel for the flexible wire (FIGS. 6 and 7) are threaded next to one another and touching each other. The wire may be a metal rope or wire or a non-metallic rope, for example, cord. The beads 11 in cross-section through the through channel have a circular, square or other regular polygonal shape, and in the cross-section parallel to the through channel, on both sides of the openings of the through channel, the beads have rounded protrusions or indentations such that the rounded protrusion of one bead and the rounded indentation of an adjacent bead form a common hinge surface defining the lateral bending of the flexible connection. Such design of the beads provides for flexibility of the flexible connection in several directions transversely to its extension, so the flexible connection can be bent at different angles in several directions laying in different planes. When the cross section of the bead is circular (FIG. 7), the rounded protrusion and indentations are annular and the flexible connection can be bent in any directions transversely to its extension. Beads with square cross section (FIG. 6) can be bent in two directions transversely to its extension said directions laying in two different planes, which are perpendicular to each other. The general shape of the beads can be disc-shaped, spherical, cuboidal, cylindrical, prismatic, truncated cone, truncated pyramid. Preferably, an indentation is formed on one side of the bead adjacent to one opening of the through channel and a protrusion corresponding to the shape of above-mentioned indentation is formed on the opposite side (FIGS. 6 and 7). In this embodiment, as the beads are threaded, the protrusion of each bead further enters the indentation of the previous bead (FIGS. 2, 3), which ensures the stability of the flexible connection. An alternative arrangement is beads with two opposing indentations and beads with two opposing protrusions alternating when strung together.

Figure 2:
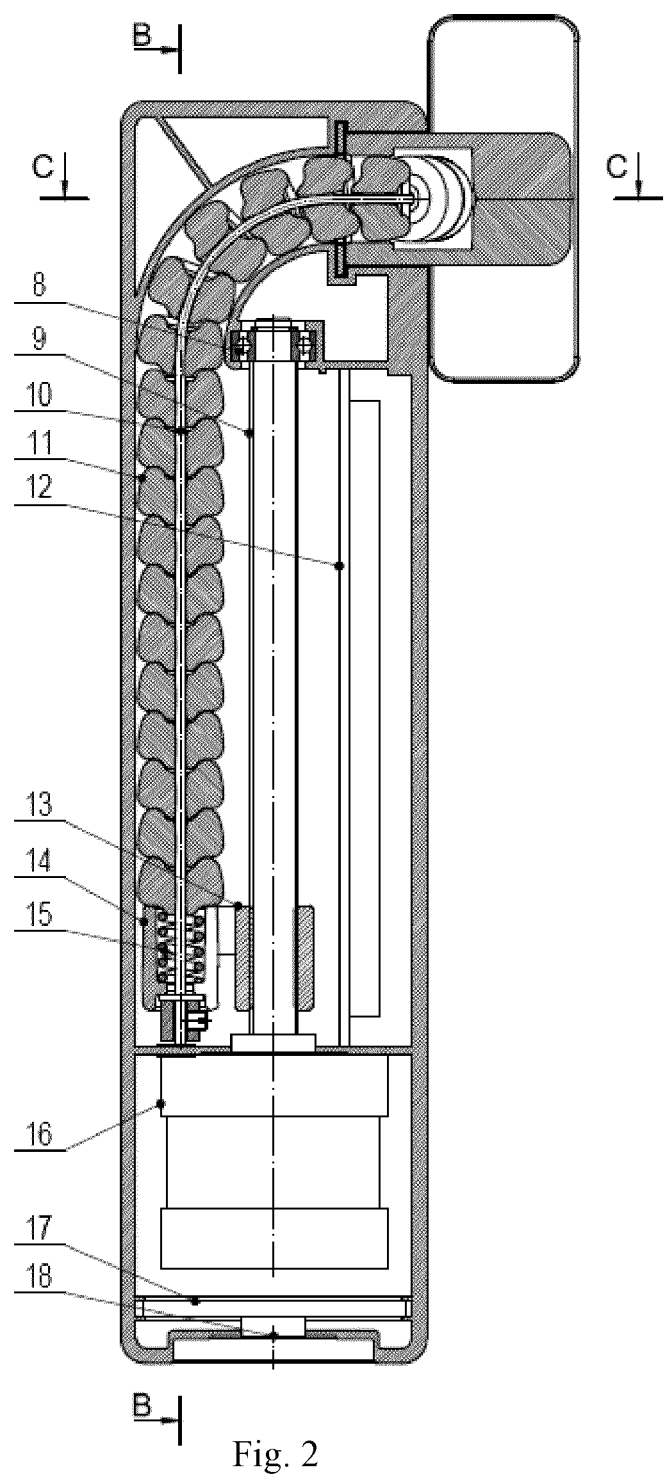
FIG. 2 is a longitudinal cross-section along the A-A line of FIG. 1.2 of the automatic opening/closing device.

The embodiment in the FIGS. 2 and 3 shows in the rear part of the flexible connection a spiral spring 15 threaded on the metal wire before the bead string. Its purpose is to tighten the flexible connection, to compensate for the flexural bending effects.

As the device limits the degree of opening of the window or door, means are provided for allowing it to be opened completely. For this purpose, a detachable joint is provided between the front end of the flexible connection and the support element 1. For the device to function properly, the detachable joint must not be disconnected from the supporting element 1 during normal conditions. The flexible connection can be detached from the support element when applying a predetermined tensile force greater than the force required to pull the support element to the housing when the device is mounted on a door or window. The force required to detach the flexible connection is greater than the force required to close the door or window. An example of such a detachable joint is a magnetic joint comprising a metal plate 22 fixed to the support element 1 and a magnet 23 mounted on the window/door attachment 2 which is located at the front end of the flexible connection (FIG. 4.1).

Also, in some cases it may be necessary to force the window/door shut quickly without waiting for the actuators to retract the flexible connection into the housing. In order to avoid damaging the device, a detachable joint is provided between the back end of the flexible connection and the motion-transforming means. This allows for the separation of the flexible connection from the motion-transforming means when applying a compressive force greater than the force required for pushing the support element from the housing at the installed position of the device. In the device shown in FIGS. 3 and 5, this detachable joint is magnetic, with the coupling element 14 connected to the rear end of the wire 10 of the flexible connection being detachably coupled to the motor nut 13. For this purpose, magnets 19 are mounted in the upper part of the coupling element 14, which attract with the corresponding magnets 19, mounted on the motor nut 13. The bracket-shaped motor nut 13 allows for the flexible connection to pass freely when the magnetic connection is disconnected. The attractive magnetic force in the detachable joint is greater than the force exerted by the motor nut 13 on the flexible connection and on the support element 1 when a door/window is opened.

The shown embodiment of the opening/closing device in the figures is provided with mounting plates 3 for attaching the housing to the window or door frames. The mounting plates 3 are mounted to corresponding sockets 31, which are located in the two opposite sides of the housing. This allows the user to choose which side of the housing to attach to the door/window frame, depending on the configuration of the window or door. The unused socket can be covered by a front decorative panel 6, as shown in FIGS. 1.2 and 3. In FIGS. 8, 9, 10 and 11, two options for attaching the opening/closing device are shown. In one embodiment (FIGS. 8 and 9), one of the sides 4 of the housing unit is mounted and the direction-changing attachment 7 is directed to the left. In the other embodiment (shown in FIGS. 10 and 11), the opposite side of the housing 5 is mounted and the direction-changing attachment 7 is directed to the right.

Preferably, the device also has a wireless connection through which it can send data and receive data and control signals from a remote motor controlling device. The wireless connection can be via Bluetooth or Wi-Fi. The remote control device may be a computer, telephone, or other fixed or mobile device.

Different sensors can be installed in the housing unit, for example a noise sensor that transmits information to the remote device through the wireless connection. Based on the received data from the noise sensor, the remote device sends a control signal to the opening/closing device for operating of the window or door.

The electronic blocks are arranged on one or more circuit boards 12 mounted in the housing.

The indoor air quality control and management system with at least one opening, according to the invention, includes: a sensor unit 27 for monitoring indoor air parameters, a noise sensor for the outside environment, an automatic opening/closing device 26 operating the at least one opening and management server 28, which collects data from the sensors. Based on the collected data the management server wirelessly transmits control signals to the automatic opening/closing device 26.

The system is suitable for any habitable rooms that have at least one window or door (for example, a balcony door) to the outside.

In the room there is a sensor unit 27 for air parameters, including at least a carbon dioxide sensor, a second noise sensor, a humidity sensor and an air temperature sensor. There may also be sensors for other harmful gases, for volatile organic compounds (VOC) gases, carbon monoxide, sensors for radiation, illumination, fine particulate matter and others. The sensor unit 27 has a wireless module for sending and receiving information to and from other units of the system. The wireless connection can be via Bluetooth or Wi-Fi through a local router.

The noise sensor is located next to the opening window or door so that it can read the noise level from the outside environment. The purpose of this sensor is to close the window when external noise levels rise above a certain level, for example above 60 dB or 90 dB. The sensor can be mounted on the inside or outside of the window or door frame. The noise sensor has a wireless module for sending and receiving information to and from the other units of the system. The wireless connection can be via Bluetooth or Wi-Fi through a local router. In a preferred embodiment of the system, the noise sensor is part of the automatic opening/closing device 26 and is connected to the wireless module of that device.

The automatic opening/closing device 26 could be mounted additionally to an existing door or window frame, which does not require the installation of special expensive windows with built-in devices. Various prior art devices equipped with a wireless communication module may be used to send and receive information to and from other units of the system. When a room has more than one opening (windows or doors) to the outside environment, the system may also have several automatic opening/closing devices mounted on all or some of the doors or windows being opened. In a preferred embodiment of the system, the above-described automatic opening/closing device according to the invention is used.

The system is controlled by a management server 28, for example a computer comprising at least a memory, a processor, a data entry module, a timing module, a wireless module, and an Internet module. The wireless module may be Bluetooth, Wi-Fi or other suitable method for wireless data transmission and reception. Through the wireless module or via the Internet, the management server 28 is connected to the sensor unit 27 for monitoring the air and noise parameters and receives real-time data and preferably stores this data in its memory. The stored data can be used for later reference, statistics and other purposes. The management server 28 is connected to the opening/closing device 26 via the wireless module for sending control signals. The connection between the management server 28 and the opening/closing device 26 may be direct, for example via the Internet using the Wi-Fi module in the opening/closing device 26, or indirect, for example via the sensor unit 27, which may be connected via Wi-Fi and via the Internet with the management server 28 and via Bluetooth to the opening/closing device 26 as shown in FIG. 12.

The management server 28 has a software application designed to analyse and compare the received sensor data with the preset threshold values of the monitored parameters. Through the software application algorithms for the operation of the system can be set and statistics can be extracted from the sensor reports, stored in the memory of the management server. When the values of the monitored parameters are below or above the relevant thresholds, or at a certain time, as indicated by the time module, the management server sends a control signal to the automatic opening/closing device, to operate a door or window. In a preferred embodiment of the system, the management server 28 is remote from the room but it receives and transmits information from and to the other devices of the enclosed system over the Internet via the Wi-Fi modules of those devices.

It is possible for the management server 28 to receive meteorological data for the outside environment via the Internet such as, temperature, humidity, pollution and other meteorological phenomena. The management server software application utilises this data to determine whether a door or window should be opened or closed. For example, if the humidity in the room is high and requires a window to be opened for ventilation, but the humidity in the outside environment is even higher, then the system will not signal to the automatic opening/closing device to open the window.

Alternatively, the management server 28 could be connected over the Internet to a software application installed on a remote client electronic device 29, such as a computer, mobile phone or tablet (FIG. 12). The management server 28 may transmit information about the monitored parameters to the client's device 29 in real time, and may receive from this client device 29 data about the reference threshold values of the monitored parameters or instructions for direct control of the opening/closing device 26. Accordingly, the user can remotely monitor the air parameters in the monitored room where the system is installed, set threshold values or threshold ranges for these parameters, set the opening and closing time of window or door or to force open or close the window or door. All this could be done remotely through the software application installed on a mobile phone, for example.

The system works by the following method:

Threshold values and/or threshold ranges for parameters that are monitored by the sensors are set in the management server. These include but are not limited to: temperature, carbon dioxide concentration, humidity, and noise level. Specific times may be set for the management server to open or close a window or door to the room.

The management server 28 receives the current values of the monitored parameters from the sensors, saves them to its memory and compares them with the preset threshold values.

In the event where the current values of the monitored parameters deviate from the threshold values or at a pre-specified time, the server 28 sends a control signal to the automatic opening/closing device 26 to operate the window or door of the room accordingly.

Preferably, the monitored parameters are ranked by priority so that the control server 28 determines what command to send to the automatic opening/closing device 26 in the event where two thresholds, which require opposite actions, are exceeded simultaneously. For example, if the amount of carbon dioxide exceeds a set point that requires the window to open but at the same time the room temperature falls below the set threshold due to the cold weather outside then the window will be required to close so that the indoor temperature does not continue to drop. In this case, if the management server 28 specifies that the temperature in the room is a priority, a command will be given to close the window. Several parameters can be prioritized and their thresholds set.

Below are provided several examples of implementing the method for control and management of indoor air quality through the system, in accordance with the invention. For the purposes of these examples, the management server 28 is connected via the Internet to the sensor unit 27, which is connected via a local wireless connection to the opening/closing device 26 (as shown on FIG. 12). In addition, the management server 28 is connected via the Internet to a remote client device 29 on which a system management software application is installed.

Example 1

The user sets values for the desired temperature, for example, 21-25° C. and/or carbon dioxide ($CO_2$) level of 400-800 ppm through the software application. This data is then transmitted to and saved in the management server 28 via an Internet connection. The management server 28 then compares these to the current sensor readings (temperature and/or $CO_2$) also received over the Internet. If necessary, the management server 28 sends a command to the opening/closing device 26 via a wireless connection, which opens or closes the operated window or door, in order to achieve the optimum level of carbon dioxide ($CO_2$) or temperature.

Example 2

The window (or door) of the monitored room is open. The noise sensor, enclosed in the opening/closing device 26, detects an increased level of external noise and transmits this data via the local wireless connection to the sensor unit 27. The sensor unit then relays this information over the Internet to the management server 28. The management server 28 compares the received noise data with the preset user-defined threshold interval, for example 40-60 dB. If the threshold range is exceeded, the management server 28 sends a command over the Internet for the opening/closing device 26 to close the door/window in order to reduce the noise level in the room.

Example 3

The user opens the software application installed on their computer or other mobile device 29. The application connects via the Internet to the management server 28 and receives information about the current sensor readings in the monitored room. The user evaluates this data and sends a close or open command through the software application. This signal is then sent over the Internet through the management server 28 which then relays the command to the sensor unit 27 to operate the opening/closing device 26.

Example 4

In the software application the user defines a specific time for ventilation of the monitored room. This information is recorded in the management server 28. At the pre-specified time the server 28 sends a command through the sensor unit 27 to the opening/closing device 26 to open the window/door in order to ventilate the room.

Example 5

The user sets combined criteria and priorities in the management server 28. For example, during the night when the user sleeps, the highest priority may be to have an optimum level of carbon dioxide ($CO_2$) in the room. The server monitors the carbon dioxide ($CO_2$) level in the room and when exceeded, sends a command through the sensor unit 27 to the opening/closing device 26 to open the window/door so that the level of carbon dioxide ($CO_2$) can be reduced by natural air convection.

Example 6

The user sets desired indoor air quality values through the software application, which are then send to the management server 28. The management server 28 compares the user input values with recognized health standards values. If they are different for example by more than 20%, a message is sent to the user's application 29 with a proposal to correct them.

Example 7

The user sets a target indoor temperature (e.g. between 21 and 25 degrees Celsius), through the application on their device, for a specific time period when there is a person sleeping in the room. Thus, the management server 28 enters "sleep mode" during the user defined time interval. The management server 28 is adapted to receive meteorological information over the Internet about the external temperature. Assuming that the outside temperature is different from that in the monitored room, the management server sends a command through the sensor unit 27 to the opening/closing device 26 to operate the window/door in order to adjust the temperature through natural air convection.

Example 8

The user sets target humidity range for the monitored room through a software application on the user device 29, for example, between 40% and 60%. These values are recorded in the management server 28. The management server 28 is adapted to receive meteorological information over the Internet about the humidity of the outside environment. When the management server 28 receives room humidity readings from the sensor unit it compares them to the humidity data from the external environment as well as with the pre-defined user humidity target range. Any discrepancies between target and actual room readings are then corrected for by the server by operating the opening/closing device 26 if the external environmental conditions allow.

Example 9

The user selects "day mode" in the application for the monitored the room. This command is then recorded in the management server 28. The user defines an algorithm for operating the window/door; for example, to open the window/door every 30 minutes for 5 minutes, and also specifies the time range for which the "day mode" is active. When the time occurs, the system switches to "day mode" and the management server 28 sends a command through the sensor unit 27 to the opening/closing device 26 to execute the user defined algorithm. Similarly, the user can set "night mode", for example, between 23 pm to 7 am to open the window/door for 3 minutes every half an hour.

The reference numbers of the technical properties are included in the claims solely with the purpose of better understanding the claims, and therefore they have no limiting effect with regards to the interpretation of the elements designated by those reference numbers.

The invention claimed is:

1. An external device for automatically opening/closing of a window or a door, consisting of
   a housing with a mounting means (3) for fixed attachment to an opening sash or to a frame of 5 a window/door, wherein in the housing are arranged:
   a stepper motor (16) with an electronic control unit (12) comprising a driver and controller with a microprocessor adapted to supply control pulses for a direction, speed and rate of the motor's rotation, and with a power source connection means (18),
   means for transforming the motor's rotational motion into a linear (9, 13),
   an extended flexible connection (10, 11) that is rigid in its extension direction and is flexible in more than one direction transversely to its extension, said directions laying in different planes, wherein said flexible connection consist of a flexible wire (10) along which numerous rigid bead-like elements (11) are threaded, said bead-like elements (11) having a central trough channel for the flexible wire (10) and are adjacent to and touch each other, the flexible connection being located in a leading groove (30) in the housing with at least one curved section for changing direction of movement of the flexible connection, wherein one end of the flexible connection being connected to the motion-transforming means and the other end of the flexible connection passing freely through an opening in the housing and being connected to a support element (1) that has means for attaching to window/door frame, wherein the motion-transforming means (9,13) is adapted to move the flexible connection (10, 11) reciprocating between front-end and rear-end final positions so that when the axis of the motor (16) is rotated in one direction the flexible connection is retracted into the housing to the rear-end final position and pulls the support element (1) and when the axis of the motor (16) is rotated in opposite direction, the flexible connection extends beyond the housing to the front-end final position and pushing the support element (1).

2. Automatic opening/closing device, according to claim 1, characterized in that the flexible connection (10, 11) is connected to the support element (1) by means of a detachable joint (2, 22, 23), allowing the flexible connection to be separated from the support element when applying a predetermined tensile force greater than the force required to pull the support element to the housing in mounted working position of the device.

3. An automatic opening/closing device, according to claim 1, characterized in that the flexible connection (10, 11) is connected to the motion-transforming means by a detachable joint (14), allowing separation of the flexible connection from the motion-transforming means when applying a compressive force greater than the force for pushing the support element from the housing in the mounted working position of the device.

4. An automatic opening/closing device, according to claim 2, characterized in that the detachable joint is a magnetic joint.

5. Automatic opening/closing device, according to claim 1, characterized in that the bead-like elements (11) in a cross-section transverse to the trough channel have a circular, square or other regular polygonal shape and in cross-section parallel to the trough channel on both sides and at the openings of the trough channel the beads have rounded protrusions or indentations, so that the rounded protrusions of one bead with the rounded indentations of an adjacent bead form a common hinge surface defining the bending of the flexible connection in more than one direction.

6. An automatic opening/closing device, according to claim 1, characterized in that the motion-transforming means is designed as a screw gear which comprises a lead screw (9) mounted in the housing with ability for free rotation in two directions and connected to the axis of rotation of the stepper motor (16), and on said screw (9) via a motor nut (13) is mounted a coupling element (14), positioned in a straight-line guide channel which allows for a reciprocating movement, wherein one end of the flexible connection (10, 11) is firmly connected to said coupling element (14).

7. An automatic opening/closing device, according to claim 1, characterized in that it further comprises a wireless communication module that is connected with a remote device, said module being connected to the electronic control unit (12) of the motor and being adapted to send data to and to receive data and control signals from said remote device to control the motor (16).

8. System for control and management of indoor air quality in a room with at least one opening that comprises:
   a sensor unit (27) for indoor air parameters comprising a wireless module for transmitting and receiving information and at least one sensor of the following group: a carbon dioxide and/or other gas sensor, a humidity sensor and a temperature sensor,
   a noise sensor with a wireless module for transmitting information located close to said least one opening of the room,
   at least one automatic opening/closing device (26), according to claim 1, attached to said at least one opening of the room with a wireless module for transmitting and receiving information,
   a management server (28) comprising at least a memory, a processor, a data input module, a timing control module, and an Internet module, said management server being connected to the sensor unit (27) for air parameters, to the noise sensor for receiving data, and further connected to the automatic opening I closing device (26) for sending control signals, wherein the management server (28) is adapted to compare the data obtained from the sensors with predetermined threshold values and/or threshold ranges, and when values of the monitored parameters are below or above the respective threshold values and/or threshold ranges and/or at a certain time, recorded by the timing module, the management server (28) is adapted to send a control signal to the automatic opening/closing device (26), to initiate opening or closing of said at least one opening of the room.

9. Air quality control and management system, according to claim 8, characterized in that the management server (28) is connected via Internet to the sensor unit for air parameters (27), and the sensor unit for air parameters (27) in turn is connected to the automatic 25 opening/closing device (26) via a local wireless connection.

10. Air quality control and management system, according to claim 8, characterized in that the noise sensor is a part of the automatic opening/closing device (26).

11. An air quality control and management system, according to claim 8, characterized in that the management server (28) is connected via the Internet to a remote client device (29), which has an installed software application, for transmitting information and receiving data for threshold values and/or control signals.

12. A method for controlling and managing of indoor air quality through the system, according to claim 8, comprising:
    setting up in the management server:
        at least one threshold and/or threshold range for each of the parameters monitored, and/or
        a certain hour of the day or an interval of time;
    receiving in the management server and comparing of current values of the monitored parameters from the sensors with the set threshold values;
    submission, when deviation from the thresholds and/or threshold ranges, and/or upon occurrence of the specified hour or expiration of the pre-specified time interval, of a control signal from the management server to the automatic opening/closing device with instructions for opening or closing of at least one opening of the room.

13. A method, according to claim 12, characterized in that the parameters monitored are ranked by priority for determining the control signal to the automatic opening/closing device.

14. A method, according to claim 12, characterized in that the parameters monitored are selected from temperature, carbon dioxide concentration, air humidity, or noise level.

\* \* \* \* \*